(12) United States Patent  (10) Patent No.: US 9,053,493 B2
Rabii et al.  (45) Date of Patent: Jun. 9, 2015

(54) AFFECTING DISPLAY OF CONTENT BASED ON NEGATIVE REACTIONS

(75) Inventors: Bahman Rabii, San Francisco, CA (US); Omer Gimenez Llach, Mountain View, CA (US); Brandon M. Pearcy, San Francisco, CA (US); Nathan P. Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 13/584,315

(22) Filed: Aug. 13, 2012

(65) Prior Publication Data

US 2014/0046753 A1   Feb. 13, 2014

(51) Int. Cl.
G06Q 30/00    (2012.01)
G06Q 30/02    (2012.01)

(52) U.S. Cl.
CPC .................. G06Q 30/0241 (2013.01)

(58) Field of Classification Search
CPC ................................................ G06Q 30/0269
USPC ...................................................... 705/14.66
See application file for complete search history.

(56) References Cited

U.S. PATENT DOCUMENTS

| 7,110,961 | B1 * | 9/2006 | Goino ......................... 705/14.14 |
| 8,074,882 | B2 | 12/2011 | Dmitriev et al. |
| 2006/0068919 | A1 * | 3/2006 | Gottfurcht ....................... 463/42 |
| 2008/0071647 | A1 | 3/2008 | McQueen et al. |
| 2009/0094096 | A1 | 4/2009 | Riise et al. |
| 2009/0113298 | A1 | 4/2009 | Jung et al. |
| 2009/0228335 | A1 * | 9/2009 | Niyogi et al. ................... 705/10 |
| 2009/0240692 | A1 * | 9/2009 | Barton et al. ...................... 707/5 |
| 2009/0287566 | A1 | 11/2009 | McAfee |
| 2010/0191680 | A1 | 7/2010 | Lee et al. |
| 2011/0106630 | A1 | 5/2011 | Hegeman et al. |
| 2012/0180107 | A1 | 7/2012 | Gammill et al. |

FOREIGN PATENT DOCUMENTS

WO    WO2012/011011    1/2012

OTHER PUBLICATIONS

International Search Report and Written Opinion in International Application No. PCT/US 2013/054552, mailed Dec. 2, 2013, 10 pages.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

Techniques for affecting display of content may include receiving a request for content to supplement a response to an input initiated by a first user; outputting first content in response to the request, where the first content includes a control feature that is displayable along with the first content, and where the control feature enables the first user to register a negative reaction to the first content; obtaining information relating to the first content based on the negative reaction; identifying second content having one or more characteristics in common with the first content; identifying one or more second users having one or more characteristics in common with the first user; and using the information relating to the first content in determining whether to provide the second content to the one or more second users.

17 Claims, 6 Drawing Sheets

AFFECTING DISPLAY OF CONTENT BASED ON NEGATIVE REACTIONS

BACKGROUND

This disclosure relates generally to affecting display of content, such as advertising, by taking into account negative reactions of users.

The Internet provides access to a wide variety of resources. For example, video, audio, and Web pages are accessible over the Internet. These resources present opportunities for other content (e.g., advertising or non-advertising content, such as audio, video, or the like) to be provided with the resources. For example, a Web page can include slots in which content can be presented. Similarly, such slots can be part of television programming.

Slots can be allocated to content providers (e.g., advertisers). In some systems, a network can be used to allocate content to the slots based, e.g., on various factors relating to the content and the context in which it is to be presented. For example, the content can be allocated based, in part, on keywords input to a system, such as a search engine. An auction can be performed for the right to present advertising in a slot. In the auction, content sponsors provide bids specifying amounts that the content sponsors are willing to pay for presentation of their content. Typically, the winning bidder is given the right to present content.

Some content providers, such as advertisers, pay based on a positive interaction with content, e.g., based on a cost-per-click (CPC) or a cost-per-conversion (CVR) basis. A click, in this context, refers to a user selecting content. A conversion, in this context, refers to an action taken, such as purchasing a product advertised in an ad.

SUMMARY

Described herein are example techniques for affecting display of content, which may include receiving a request for content to supplement a response to an input initiated by a first user; outputting first content in response to the request, where the first content includes a control feature that is displayable along with the first content, and where the control feature enables the first user to register a negative reaction to the first content; obtaining information relating to the first content based on the negative reaction; identifying second content having one or more characteristics in common with the first content; identifying one or more second users having one or more characteristics in common with the first user; and using the information relating to the first content in determining whether to provide the second content to the one or more second users. The example techniques may include one or more of the following features, either alone or in combination.

The information relating to the first content may be used t in determining whether to provide the first content or the second content to the first user in the future. The information may be used to prevent providing the first content or the second content in the future, and/or the information may be used to limit providing the first content or the second content in the future.

The control feature may include an interactive control feature to close the first content or to be redirected away from the first content, and/or may include an interactive control feature to provide feedback about the first content.

The one or more characteristics of the second content may relate to whether: (1) the first content is part of a same distribution campaign as the second content, (2) the first content and the second content are owned or distributed by a same entity, or (3) the first content and the second content direct users to a domain controlled by a same entity. The one or more characteristics of the second content may relate to whether: (1) the first content and the second content have a topic in common, or (2) the first content and the second content direct users to a same domain or to domains having similar topics. The one or more characteristics of the second content may relate to a relationship of a brand associated with the first content to a brand associated with the second content.

Identifying one or more second users having one or more characteristics in common with the first user may include identifying elements of a profile for the first user that match elements of one or more profiles for the one or more second users, where the elements relate to demographics associated with the first user and the one or more second users.

It may be determined not to provide the second content to the one or more second users based on the information. It may be determined to provide the second content a less favorable position in an auction for providing content to the one or more second users. It may be determined to increase the price of the second content relative to other content to be provided to the one or more second users.

The information relating to the first content may be used in determining whether to provide the second content to the one or more second users in a context, where the context relates to at least one of an aspect of the response to the input and a time at which the first content is to be provided.

The information may be obtained based also on negative reactions to the first content by other users. The information may indicate whether the first content elicits a negative reaction in general, elicits a negative reaction in a particular topical or temporal context, or elicits a negative reaction by users having one or more characteristics in common.

The systems and techniques described herein, or portions thereof, may be implemented as a computer program product that includes instructions that are stored on one or more machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are techniques for affecting display of content (e.g., advertisements, audio, video, Web pages, or the like) based on negative reactions to presented content. In an example implementation, content items presented to users include user interface elements that users can interact with to indicate a negative reaction to the content. For example, a user may find a particular advertisement or the product it advertises to be overly repetitive (e.g., the user has seen the ad too many times), irrelevant (e.g., the advertisement has no relation to the context of the page in which it was presented), uninteresting, offensive, etc. The user may indicate such a negative reaction by interacting with the user interface element. In response, the offending content item may be removed from view, and the user's reaction may be used to reduce the likelihood of this or other similar and potentially offensive content from being presented to the user in the future.

The suppression of content, such as that described above, can improve the individual user's experience by reducing the amount of annoying or offensive content that he or she is exposed to. Such suppression of content can also improve the experience of content publishers whose content can include potentially offending or annoying advertisements (e.g., users are less likely to be driven away by offending ads). The suppression of content may also increase the revenues provided to content publishers through advertising (e.g., by not wasting advertising space on offending content in favor of content that may be more likely to generate click-through revenue). Such suppression can also improve the efficiency of advertising campaigns, since users who react negatively to identified advertisements may be less likely to see them again, thereby possibly reducing the occurrence of paid ad impressions being presented to disinterested users.

In a general example, a user may browse a Web page that includes advertising content provided by a content server. One of the ads may advertise a steakhouse, but the user may be a vegetarian. In such an example, the user is likely to be at least uninterested in the ad, if not being outright offended by it. The ad includes a user control that the user can click to close or otherwise remove the ad. This user action sends feedback to the content server to indicate that the user has reacted negatively to the ad. In some examples, the content server may use this information to prevent the steakhouse ad from being presented to the user again. In some examples, the content server may use this information to prevent similar ads from being shown to the user (e.g., ads for hamburgers). In some examples, the content server may use this information to prevent the ad from being presented to other users (e.g., other users how have identified themselves as being vegetarians).

Figure 1:
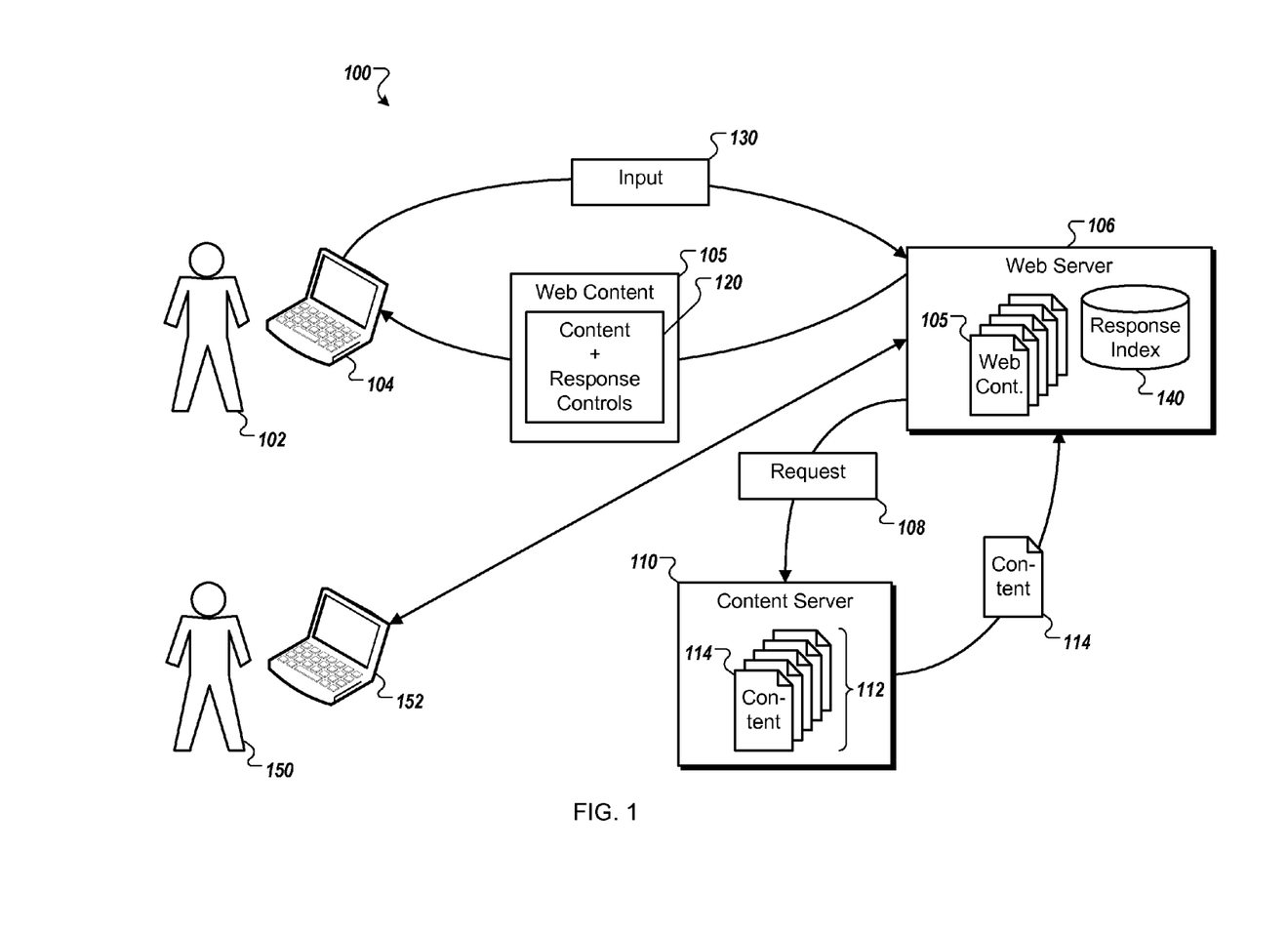
FIG. 1 is a block diagram of an example system for distributing content to users over a network.

FIG. 1 is a block diagram of an example system 100 for distributing content to users over a network. A user 102 uses a computer device 104 to browse Web content 105 (e.g., Web pages, streaming video, streaming audio) provided by a Web server 106.

The Web server 106 sends a request 108 to a content server 110 that hosts a collection of content 112 (e.g., advertisements). The request 108 is a request for a content item 114 that is hosted by the content server 110. The content server 110 responds by sending one or more content items 114 to the Web server 106 for inclusion in the Web page 105 that is provided to the computer device 104 for presentation to the user 102 in response to an initial browser input.

In its provided form, the Web page 105 includes a content item 120 that includes both content information (e.g., the content item 114, e.g., the advertising message) and one or more user controls. In its presented form, the user 102 can click or otherwise select the user controls in the content item 120 to indicate a negative reaction to the content information in the content item 120. Embodiments of content items with user controls, such as the content item 120, are discussed below in the descriptions of FIGS. 2, 3A, and 3B.

The user's 102 negative reaction and interaction with the user controls causes a user input message 130 to be sent to the Web server 106. The user input message 130 is processed by the Web server 106 to receive, and interpret, the user's 102 negative response. The Web server 106 stores information about the user input message 130 in a response index 140 (e.g., in a database). For example, with appropriate permission from the user, the Web server 106 may store a record of the user's 102 negative response, the user's 102 identity or an anonymous identifier, the identity of the content item 120, the identity of the content item 114, and/or combinations of these and other appropriate information that may describe the user's reaction to the content item 120.

In some implementations, the user input message 130 may include additional information that describes the user's 102 negative reaction and/or the context in which the reaction occurred. For example, the response controls may provide user controls with which the user 102 can interact to express the reason for his or her negative reaction. For example, the response controls may provide a way for the user 102 to express "I have seen this ad too many times," "I am not interested in this product, good, or service," "I find this ad to be offensive", or any other appropriate reason why the content item 120 was found to be undesirable. Such information may be stored in the response index 140 in association with other information descriptive of the user's 102 negative reaction.

The Web server 106 may use the information stored in the response index 140 for selecting content 112 during future Web page requests. This may be done, e.g., to prevent offending content, or content similar to the offending content, from being presented to the user 102. In this context, the word "offending" does not necessarily mean that the content is offensive, but rather only that the user has indicated some disinterest in the content. In an example, the user may indicate a negative reaction to an advertisement for "ABC Brand chewing gum", and the Web server 106 can use information collected about the negative reaction to prevent the "ABC Brand chewing gum" advertisement from being presented to the user 102 again. In another example, the Web server 106 can use the negative reaction to "ABC Brand chewing gum" to prevent similar ads from being presented to the user 102, such as ads for "XYZ Brand chewing gum," or "ABC Brand candy bars." In another example, the Web server 106 can use the negative reaction to "ABC Brand chewing gum" to prevent ads, such as those described above, from being provided to users who have one or more features in common with the user. For example, the system may identify, e.g., based on users' profiles, social networks, or other relevant information that two users have the same interests, fit into the same demographic, have the same likes/dislikes, and so forth. In this case, the Web server 106 may use the negative reaction to "ABC Brand chewing gum" to prevent ads, such as those described above, from being provided to both users.

In other examples, rather than preventing ads from being provided to users, the Web server 106 may reduced the frequency at which such ads are provided, limit the context in which such ads are provided (e.g., to times of day, in conjunction with certain types of content, etc.), and so forth.

By way of example, in some implementations, the information stored in the reaction index 140 may include contextual information about the user's 102 negative reaction. For example, the time of day, the geographical location, the identity of the computing device 104, the identity of the network used to transport the user input message 130, and/or combinations of these and other appropriate contextual information may be stored in association with the user's 102 negative reaction. For example, the user may be averse to seeing certain types of content items (e.g., dating Website ads, bar ads, job hunting Website ads) while at work (e.g., the computing device 104 is a work computer, the message 130 was sent from a corporate network, the reaction happened between 9 am and 5 pm). The user 102, however, may have different reactions to the same or similar content under different conditions (e.g., the user is at home or is using a personal device).

In some implementations, the Web server 106 may use contextual information to determine which of the content items 114 to suppress, and when or where to suppress their delivery to the user 102. For example, the Web server 106 may provide the content item 114 while the user 102 browses from home, and prevent the content item 114 from being provided to the user 102 at work.

In another example, a user 150 uses a computer device 152 to request Web content 105 from the Web server 106. The Web server 106 identifies the user 150 and determines if the user 150 has one or more characteristics in common with the user 102. For example, the user 150 may share a common demographic trait, or may have explicit or implicit preferences are similar to those of the user 102. The Web server 106 uses this information and information about the user's 102 negative responses to determine whether the content item 114 should be prevented from being presented to the user 150 or whether presentation of content item 114 should be changed (e.g., limited). For example, if the Web server 106 determines that the user 102 and the user 150 have similar characteristics, then the user's 102 negative reaction to an advertisement for "Subpar Airlines" can be used to prevent the "Subpar Airlines" ad, or ads similar to it, from being presented to the user 150.

Figure 2:
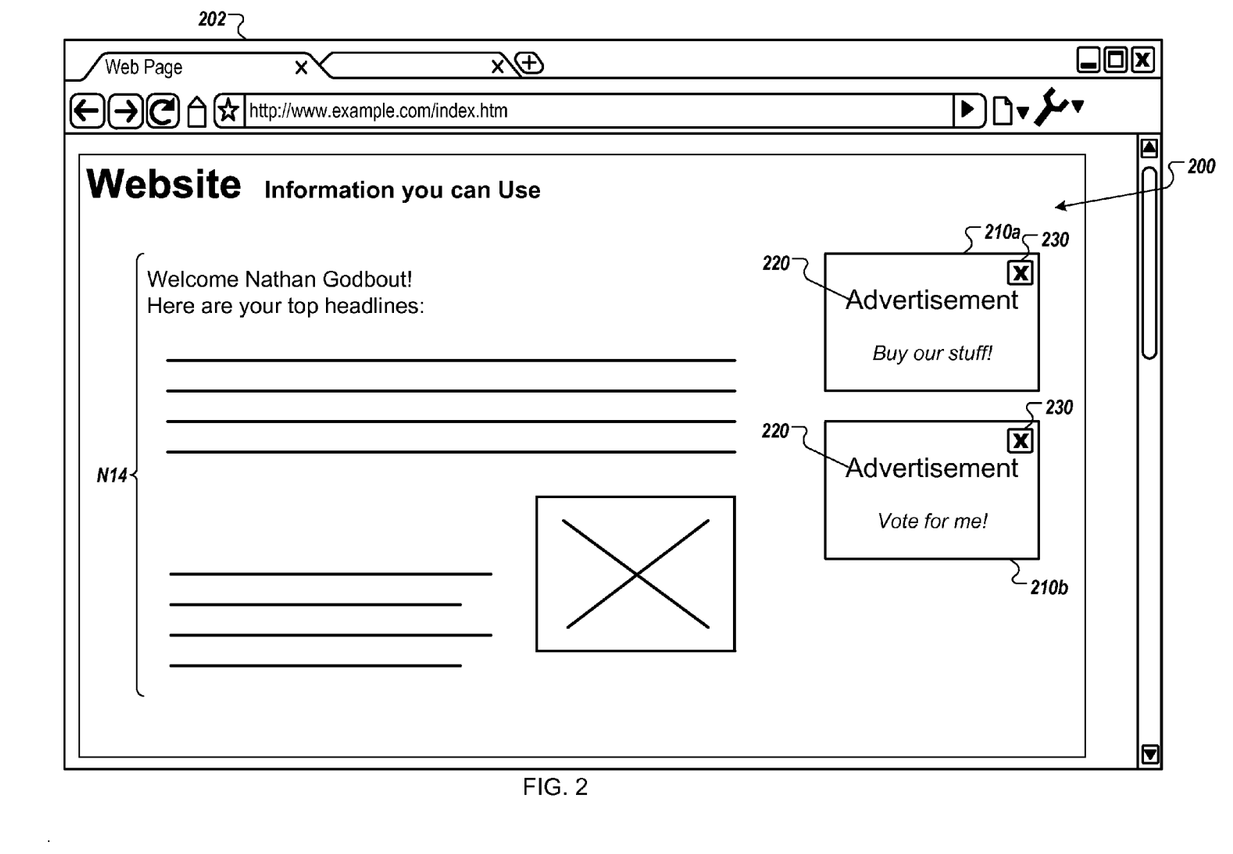
FIG. 2 is an example user interface that includes an example content item that provides elements for receiving negative reactions.

FIG. 2 is an example user interface 200 that includes an example content item 210a and an example content item 210b that provide elements for receiving negative reactions. In the illustrated example, the user interface 200 is a Web page rendered by a Web browser 202.

In this example, the content items 210a-210b are rendered as part of the user interface 200. In some implementations, the content items 210a-210b can be advertisements, but in other implementations the content items 210a-210b can be any appropriate form of content (e.g., embedded media, video clips, news articles). The content items 210a-210b include content 220 (e.g., advertising messages) and a user control 230.

In this example, the user control 230 is a user interface element that the user can click or otherwise interact with to express a dislike for the associated content 220. In some implementations, the user may click the user control 230 to close or otherwise hide the content item 210a or 210b from view in the user interface 200. In some implementations, the user may click the user control 230 to reload the current Web page or to redirect the user to another Web page. This action may also trigger the transmission of a user input message, such as the user input message 130 of FIG. 1, to be sent to a Web server (e.g., the Web server 106) that provided the content of the user interface 200.

In some implementations, in response to the user clicking the user control 230, another user control may also be presented to the user in an attempt to collect more information from the user as to why the associated content 220 generated a negative reaction. In some implementations, such other user controls may be provided with the original content item and not in response to user input.

Figure 3A:
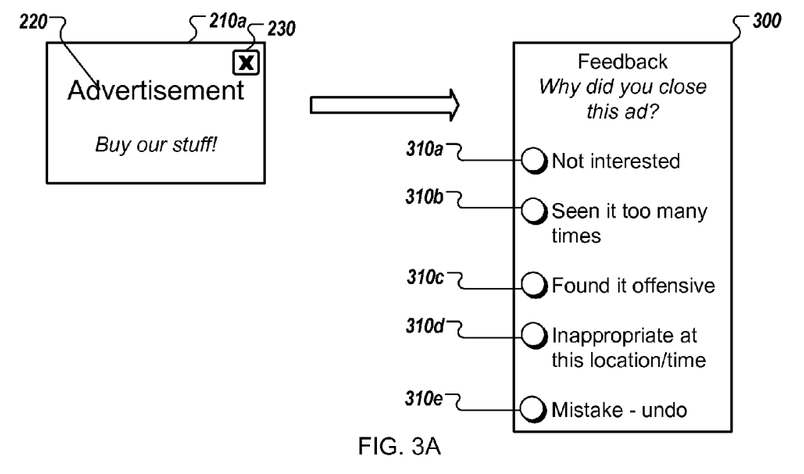
FIGS. 3a and 3b are example user interfaces for receiving information about negative reactions.
Figure 3B:
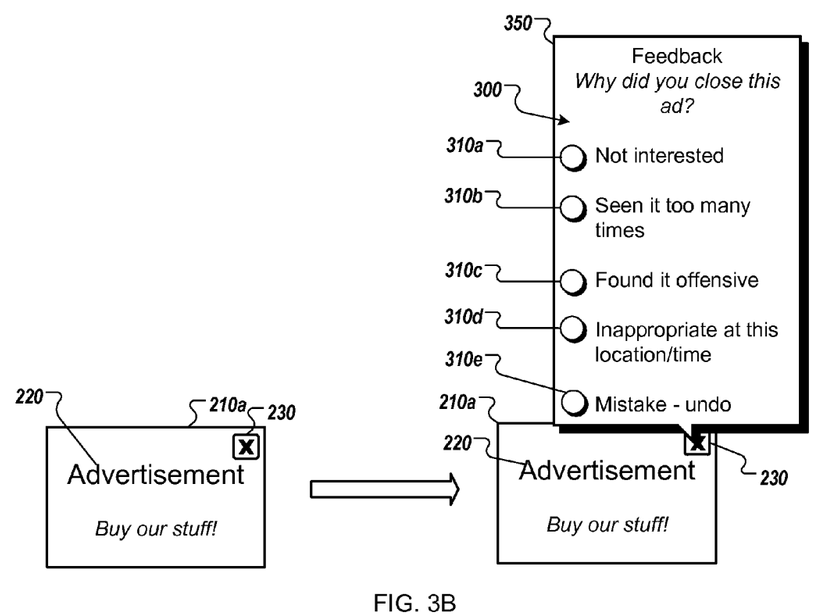

Referring now to FIGS. 3a and 3b, two examples of such user controls are described. FIGS. 3a and 3b are example user interfaces for receiving information about negative reactions. Referring now to FIG. 3A, the content item 210a of FIG. 2 is shown. The user indicates a negative reaction to the content 220 by clicking the user control 230. In response to this user action, the content item 210a is replaced by a user control 300.

In this example, the user control 300 is a collection of user interface elements that invite the user to voluntarily provide additional information as to why the user reacted negatively to the content 220. For example, the user may click a user control 310a to express that he or she is simply not interested in the product being advertised by the content 220, click a user control 310b to express that he or she has seen this or similar content 220 too many times, click a user control 310c to express that the content 220 was found to be offensive, or click a user control 310d to express that the content 220 was inappropriate for viewing at that particular place or time. Information describing the user's selection is then provided to the hosting Web server as part of a user input message, such as the user input message 130.

The user control 300 also includes a user control 310e. The user can click the user control 310e to indicate that he or she clicked the user control 230 in error. In some implementations, by clicking the user control 230 the content item 210a may be restored to its original appearance. In some implementations, clicking the user control 310e may prevent transmission of the user input message 130. In some implementations, clicking the user control 310e may send a user input message 130 to the hosting Web server, requesting that the Web server remove (e.g., from the response index 140) previously submitted negative responses associated with the content 220. In some implementations, a blank field may be incorporated into control 300, into which the user may type comments free-form.

FIG. 3B shows another example of how the user control 300 may be implemented. In this example, a dialog box 350 is presented to the user in response to activation of the user control 230 (although, as noted above, the dialog box may be provided with the original content and not in response to activation of the user control). The dialog box 350 includes the user control 300 and the functionality it provides as was described previously. In the illustrated example, the dialog box 350 is superimposed over the content item 210a or over the user interface 200 of FIG. 2. In some implementations, the dialog box 350 may partly or entirely obscure the user's view of the content 210a. In some implementations, the dialog box 350 may provide visual cues that indicate to which content item the dialog box 350 is associated. For example, the dialog box 350 may appear as a cartoon bubble emanating from the content item 210a. In another example, the dialog box 350 may be presented in an animation in which the dialog box 350 appear to "fly out" from the content item 210a in response to activation of the user control 230.

The processes described herein may be implemented in any appropriate network environment, with any appropriate devices and computing equipment. An example of such an environment is described below.

Figure 4:
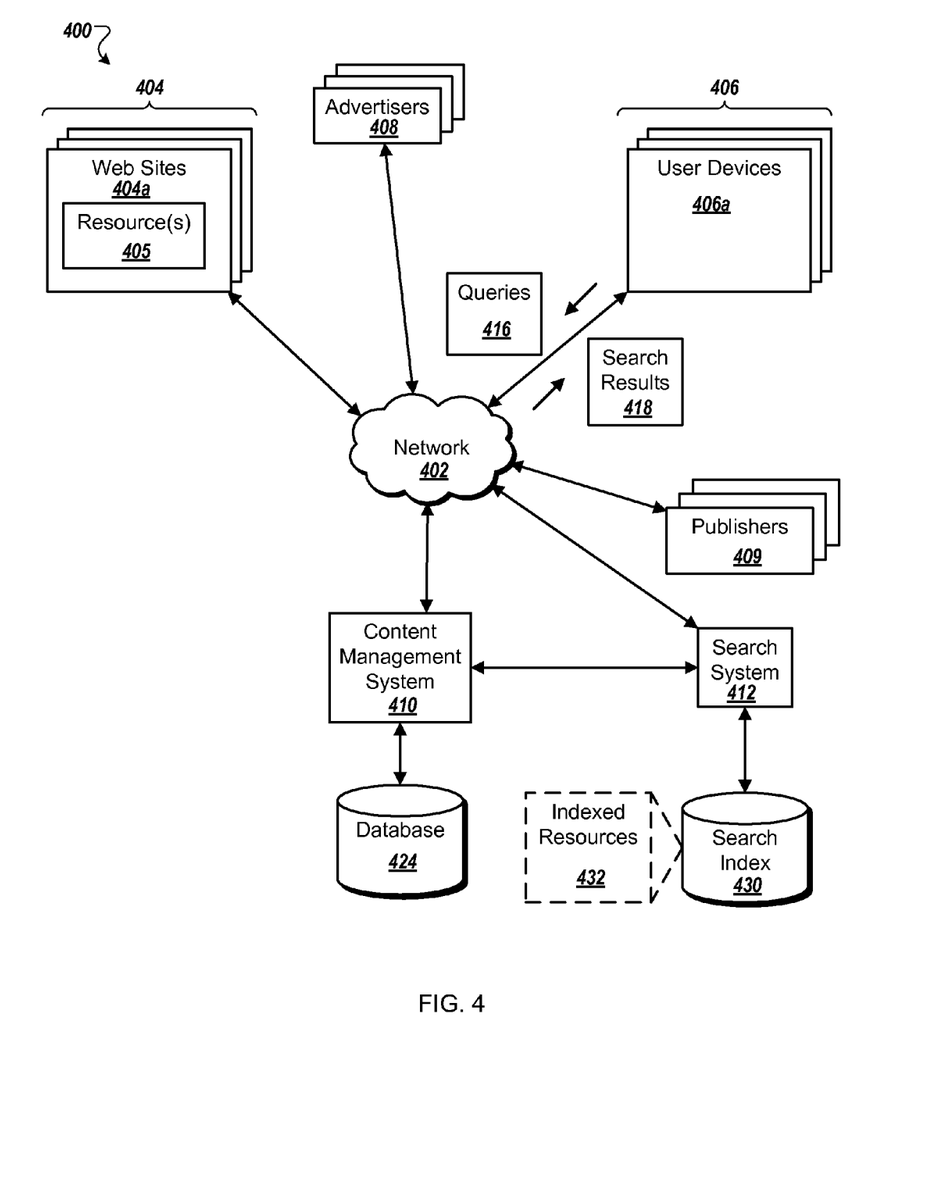
FIG. 4 is a block diagram of an example network environment.

FIG. 4 is a block diagram of an example network environment 400 that may be used in the processes described herein for affecting display of content (e.g., advertisements) based on negative reactions to presented content.

As shown in FIG. 4, network 402 connects various entities, such as Web sites 404, user devices 406, content providers (e.g., advertisers 408), online publishers 409, television broadcasters 434, and a content management system 410. In this regard, example environment 400 may include many thousands of Web sites 404, user devices 406, and content providers (e.g., advertisers 408 or other purveyors of content). Entities connected to network 402 include and/or connect through one or more servers. Each such server may be one or more of various forms of servers, such as a Web server, an application server, a proxy server, a network server, or a server farm. Each server can include one or more processing devices, memory, and a storage system.

Network 402 can represent a communications network that can allow devices, such as a user device 406a, to communicate with entities on the network. Network 402 can include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, WiFi, or other such transceiver.

In FIG. 4, Web sites 404 may include one or more resources 405 associated with a domain name and hosted by one or more servers. An example Web site 404a is a collection of Web pages formatted in hypertext markup language (HTML) that can contain text, images, multimedia content, and programming elements, such as scripts. Each Web site 404 can be maintained by a publisher 409, which is an entity that controls, manages and/or owns the Web site 404.

A resource 405 may be any appropriate data that can be provided over network 402. A resource 405 can be identified by a resource address that is associated with the resource 405. Resources 405 can include HyperText Mark-up Language (HTML) pages, word processing documents, portable document format (PDF) documents, images, video, and news feed sources, to name a few. Resources 405 can also include content, such as words, phrases, images, video and sounds, that may include embedded information (such as meta-information hyperlinks) and/or embedded instructions (such as Java-Script scripts).

To enable searching of resources 405, environment 400 can include a search system 412, as described below, that identifies resources 405 by crawling and indexing resources 405 provided by the content publishers on the Web sites 404. Data about the resources 405 can be indexed based on the resource 405 to which the data corresponds. Indexed and, optionally, cached copies of the resources 405 that match input keywords can be retrieved and output.

An example user device 406a is an electronic device that is under control of a user and that is capable of requesting and receiving resources over the network 402. A user device (examples of which include computer devices 104 and 152 of FIG. 1) may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the user device can be included as part of a motor vehicle (e.g., an automobile, an emergency vehicle (e.g., fire truck, ambulance), a bus).

User device 406a can request resources 405 from a Web site 404a. In turn, data representing the resource 405 can be provided to the user device 406a for presentation by the user device 406a. User devices 406 can also submit search queries 416 to the search system 412 over the network 402. A request for a resource 405 or a search query 416 sent from a user device 406 can include an identifier, such as a cookie, identifying the user of the user device.

In response to a search query 416, the search system 412 can access a search index 430 to identify resources 405 in a collection of indexed resources 432 that are relevant to the search query 416. As described below, the search system 412 identifies resources 405 in the form of search results 418 and returns the search results 418 to a user device 406 in search results pages. A search result 418 may include data generated by search system 412 that identifies a resource 405 that is responsive to a particular search query 416, and that includes a link to the resource 405. An example search result 418 can include a Web page title, a snippet of text or a portion of an image extracted from the Web page, and the URL (Unified Resource Location) of the Web page. With appropriate permission, the search index may store, index, and make accessible information about users including, for example, their profiles, social networks (as represented by social graphs) and so forth.

Content management system 410 may be used for selecting and providing content in response to requests for content. Content management system 410 also can update a database 424 based on activity of a user. The database may be separate, as shown, or part of the search index. With appropriate user permission, the database 424 can store a profile for the user which includes, for example, information about past user activities, such as visits to a place or event, past requests for resources 405, past search queries 416, other requests for content, social network profiles and connections, Web sites visited, or interactions with content. In some implementations, the information in database 424 can be derived, for example, from one or more of a query log, an advertisement ("ad") log, or requests for content. The database 424 can include, for each entry, a cookie identifying the user, a timestamp, an IP (Internet Protocol) address associated with a requesting user device 406, a type of usage, and details associated with the usage.

When a resource 405 or search results 418 are requested by a user device 406, content management system 410 can receive a request for content to be provided with the resource 405 or search results 418. The request for content can include characteristics of one or more "slots" that are defined for the requested resource 405 or search results page. For example, the data representing the resource 405 can include data specifying a portion of the resource 405 or a portion of a user display, such as a presentation location of a pop-up window or a slot of a third-party content site or Web page, in which content can be presented. An example slot is an ad slot. Search results pages can also include one or more slots in which other content items (e.g., ads) can be presented.

Information about slots can be provided to content management system 410. For example, a reference (e.g., URL) to the resource for which the slot is defined, a size of the slot, and/or media types that are available for presentation in the slot can be provided to the content management system 410. Similarly, keywords associated with a requested resource ("resource keywords") or a search query 416 for which search results are requested can also be provided to the content management system 410 to facilitate identification of content that is relevant to the resource or search query 416. For example, the content management system identifies content, such as advertising, that is associated with keywords that match, or are substantially similar to, the input keywords (e.g., are a variant of the keywords, such as "car" or "cars"). When a match is detected, content management system 410 outputs the corresponding content. The processes described herein may be used to serve customized ads based, e.g., on input keywords or other search query content.

Based at least in part on data included in a request, content management system 410 can select content that is eligible to be provided in response to the request (referred to as "eligible content items"). For example, eligible content items can be eligible ads having characteristics matching the characteristics of ad slots and that are associated with user-provided keywords (e.g., terms in the input search query). The universe of eligible content items (e.g., ads) can be narrowed by taking into account other factors, such as the content of previous search queries 416. For example, content items corresponding to historical search activities of the user including, e.g., search keywords used, particular content interacted with, sites visited by the user, etc. may also be used in the selection of eligible content items by the content management system 410.

Content management system 410 can select the eligible content items that are to be provided for presentation in slots of a resource 405 or search results page 418 based, at least in part, on results of an auction. For example, for eligible content items, content management system 410 can receive bids from content providers (e.g., advertisers 408) and allocate slots, based at least in part on the received bids (e.g., based on the highest bidders at the conclusion of the auction). The bids are amounts that the content providers are willing to pay for presentation (or selection) of their content with a resource 405 or search results page 418. For example, a bid can specify an amount that a content provider is willing to pay for each 1000 impressions (i.e., presentations) of the content item, referred to as an ECPM bid. Alternatively, the bid can specify an amount that the content provider is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

In some implementations, a content provider can bid for a targeted audience of users. For example, one or more of the publishers 409 and/or the content management system 410 may provide one or more audiences of users, where each user in the audience matches one or more targeting criteria, such as matching one or more demographics. An audience of users may be represented, for example, as a user list. User lists or other representations of audiences may be stored, for example, in the database 424. A bid from a content provider can specify, for example, an amount that the content provider is willing to pay for each 1000 impressions (i.e., presentations) of the content item to a particular audience of users. The content management system 410 may, for example, manage the presentation of the content item to users included in a particular audience and may manage charging of the content provider for the impressions and distributing revenue to the publishers 409 based on the impressions.

Figure 5:
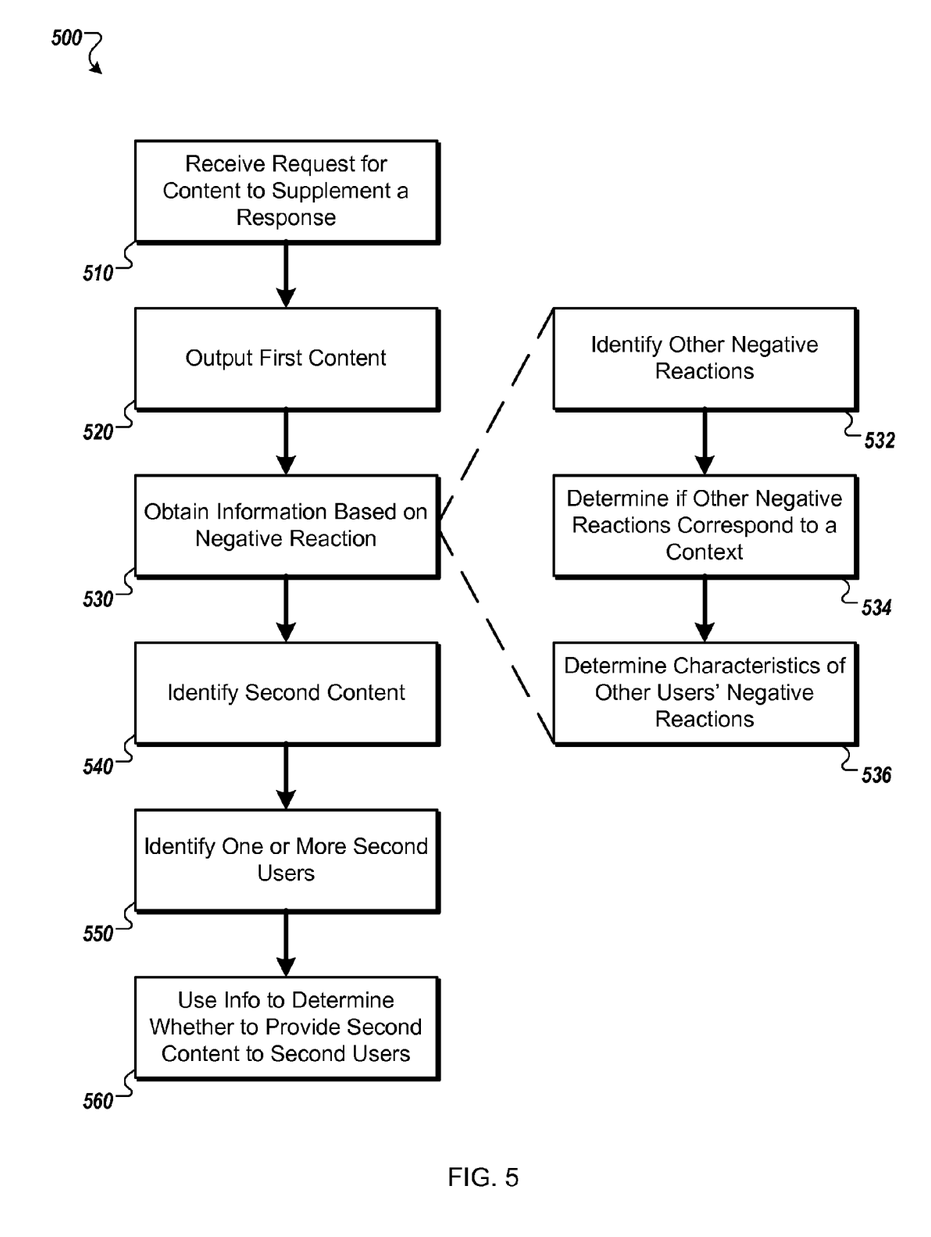
FIG. 5 is a flow chart showing an example process for distributing content to users over a network.

FIG. 5 is a flow chart showing an example process 500 for affecting display of content (e.g., advertisements) based on negative reactions to presented content. Process 400 may be performed, e.g., by the Web server 108 either alone or in conjunction with the content management system 410.

In the process 500, a request for content to supplement a response to an input initiated by a first user is received (510). For example, the user 102 may request Web content 105 from the Web server 106. The Web server 106 requests and receives content 120 (e.g., advertising) from the content server 110. The Web server 106 includes the content 114 in the Web content 105 that is provided in response to the user's 102 request.

This first content 114 is output (520) in response to the request. In this example, the content 120 includes a control feature that is displayable along with the first content. The control feature enables the first user to register a negative reaction to the first content. For example the first content can be the content 220 of FIG. 2, and the control feature can be the user control 230 that the user can click to indicate that he or she dislikes the first content.

In some implementations, the control feature can include an interactive control feature to close the first content or to be redirected away from the first content. For example, the user 102 may click the user control 230 to close the content item 210a or to be directed to another Web page. In some implementations, the control feature can include an interactive control feature to provide feedback about the first content. For example, in response to the user 102 clicking the user control 230, the user control 300 may be presented to request additional information from the user 102. In some cases, the user may be afforded the opportunity to provide such additional information without first clicking on the user control. For example, a feature, such as feature 300 of FIG. 3 may be incorporated into the initial content 120 (or 220) provided in response to the original request.

Information relating to the first content is obtained (530) from the user based on the negative reaction. For example, the Web server 106 may obtain the user input message 130, which was sent in response to the user's 102 negative reaction to the content 114 through interaction with the provided content (e.g., through closing the content, commenting on the content, and so forth).

In some implementations, obtaining (530) information relating to the first content can be performed by identifying other negative reactions (532), determining if other negative reactions correspond to a context (534), and determining characteristics of other users' negative reactions (536). The information relating to the first content can be used in determining whether to provide the second content to the one or more second users in a context, where the context is related to at least one of an aspect of the response to the input and a time at which the first content is to be provided. For example, a first user may generally not consider his weekend entertainment options on a Monday and reject an advertisement for a movie, but he may not reject movie advertisements on a Friday (e.g., he may be willing to think about going to a movie that night). In this example, the advertisements share a common context of "movies" or "entertainment", but the determination of whether to show similar advertisements to other users may be based in part on the day of the week as determined from the first user's responses.

In some implementations, the information can be obtained based also on negative reactions to the first content by other users. Here, the information indicates whether the first content elicits a negative reaction in general, elicits a negative reaction in a particular topical or temporal context, or elicits a negative reaction by users having one or more characteristics in common. For example, a particular advertisement may elicit negative reactions from a wide population of users, and based on this information a determination may be made to prevent the ad from being presented to other users. In another example, a particular advertisement may elicit negative reactions when the ad is provided in a particular type of Web page (e.g., a steakhouse ad in a vegetarian Website) and, based on this information, a determination may be made to prevent the ad from being presented to other users who are browsing similar contextual content. In another example, a particular advertisement may elicit negative reactions when the ad is provided during a particular time of day, week, season, or year (e.g., dating Website ads on a Monday, swimwear ads in winter, breakfast ads at night, Independence Day ads on July 5) and, based on this information, a determination may be made to prevent the ad from being presented to other users during similar periods of time. In yet another example, a particular advertisement may elicit negative reactions from users who have one or more characteristics in common (e.g., the users share a demographic trait, or an explicitly or implicitly determined aversion to a particular topic) and, based on this information, a determination may be made to prevent ad rejected by the first user from being presented to other users who share similar characteristics. With appropriate permission, users' profiles and/or social graphs may be searched to determine whether two users have appropriate features in common.

In this example, second content (e.g., a second advertisement) having one or more characteristics in common with the first content is identified (540). For example, the user 102 may have indicated a negative response to an advertisement for "Acme Brand Automobiles". In response, the Web server 106 my identify advertisements for "XYZ Brand Automobiles" (e.g., both ads are for automobiles) and/or "Acme Brand Boats" (e.g., both ads are for Acme products) has having some features in common with the offending advertisement.

In some implementations, the one or more characteristics of the second content may relate to whether the first content is part of a same distribution campaign as the second content, the first content and the second content are owned or distributed by a same entity, or the first content and the second content direct users to a domain controlled by a same entity. For example, two different ads may both be part of the "Elect Major Bigspender" political campaign, and a negative reaction to one of the ads may be used as an indication that the second ad should also be suppressed for the same, or similar, user. In another example, the "AAA Advertising Agency" may tend to produce edgy and possibly offending advertisements. A user's negative reaction of one of this agencies' ads may be a good indication that the user, or similar users, may also react negatively to the agencies other ads for other products, and that those ads should not be shown to the user either. In yet another example, a user's negative reaction to an advertisement may indicate that the user, or similar user, has no interest in any ad for any product produced by an identified company.

In some implementations, the one or more characteristics of the second content can relate to whether the first content and the second content have a topic in common, or the first content and the second content direct users to a same domain or to domains having similar topics. For example, an ad for "Acme Brand Automobiles" and an ad for "XYZ Brand Automobiles" may both share a topic of "automobiles". In other example, an ad for the "SuperPen 2000" and an ad for the "Pencil-o-Matic" may both direct users to subdomains of the "writinginstrumentcompany.com" Internet domain, or to two different domains that have been determined (e.g., crawled) as both pertaining to writing instrument products.

In some implementations, the one or more characteristics of the second content can relate to a relationship of a brand associated with the first content to a brand associated with the second content. For example, an ad for "Acme Brand Automobiles" and an ad for "Acme Brand Boats" may be related to each other through the common "Acme" branding of both advertised products.

One or more others users having one or more characteristics in common with the first user are identified (550). For example another user may share a common demographic with the user 102, or may have had negative reactions that resemble those of the user 102 in the past. In examples such as these and others, the other user may be identified as having one or more characteristics in common with the user 102.

In some implementations, identifying (550) one or more second users having one or more characteristics in common with the first user can include identifying elements of a profile for the first user that match elements of one or more profiles for the one or more second users. The profile elements may relate, e.g., to demographics associated with the first user and the one or more second users. For example, the user 102 may be known (e.g., from explicitly provided information) to be a man, age 20, who has expressed a negative reaction to an advertisement for the upcoming movie "Cyber Alien Laser War 3", and his reaction may prevent the ad from being presented to other users who are identified as men, ages 18-30.

The information relating to the first content is used (560) in determining whether to provide the second content to the one or more second users. For example, if the user 102 has indicated a negative response to an advertisement for "Acme Brand Motors", then the "XYZ Brand Automobiles" advertisement may be prevented from being presented to the other user(s).

In some implementations, the information relating to the first content may be used in determining whether to provide the first content or the second content to the same user in the future. For example, if the user 102 has indicated a negative response to an advertisement for "Acme Brand Motors", then that response may be used to prevent the "Acme Brand Motors" and/or the "XYZ Brand Automobiles" may be prevented from being presented to the user 102 or the other user in the future.

In some implementations, the information relating to the first content may be used to limit providing the first content and/or the second content to the first user in the future. For example, a negative reaction by the user 102 to a particular ad may cause the Web server 106 to show that ad to the user 102 less often.

In some implementations, the second content may be provided in a less favorable position in an auction for providing content to the one or more second users. For example, the price of the second content may be increased relative to other content to be provided to the one or more second users. For example, an offending advertisement may impose a relatively greater burden upon a Web content provider (e.g., the provider runs a relatively greater risk of driving readers away by presenting them with ads to which they may react adversely). The advertisers behind the offending ads may therefore be asked to pay a relatively higher price, compared to less offending ads, to compensate the Web providers for presenting such ads.

Figure 6:
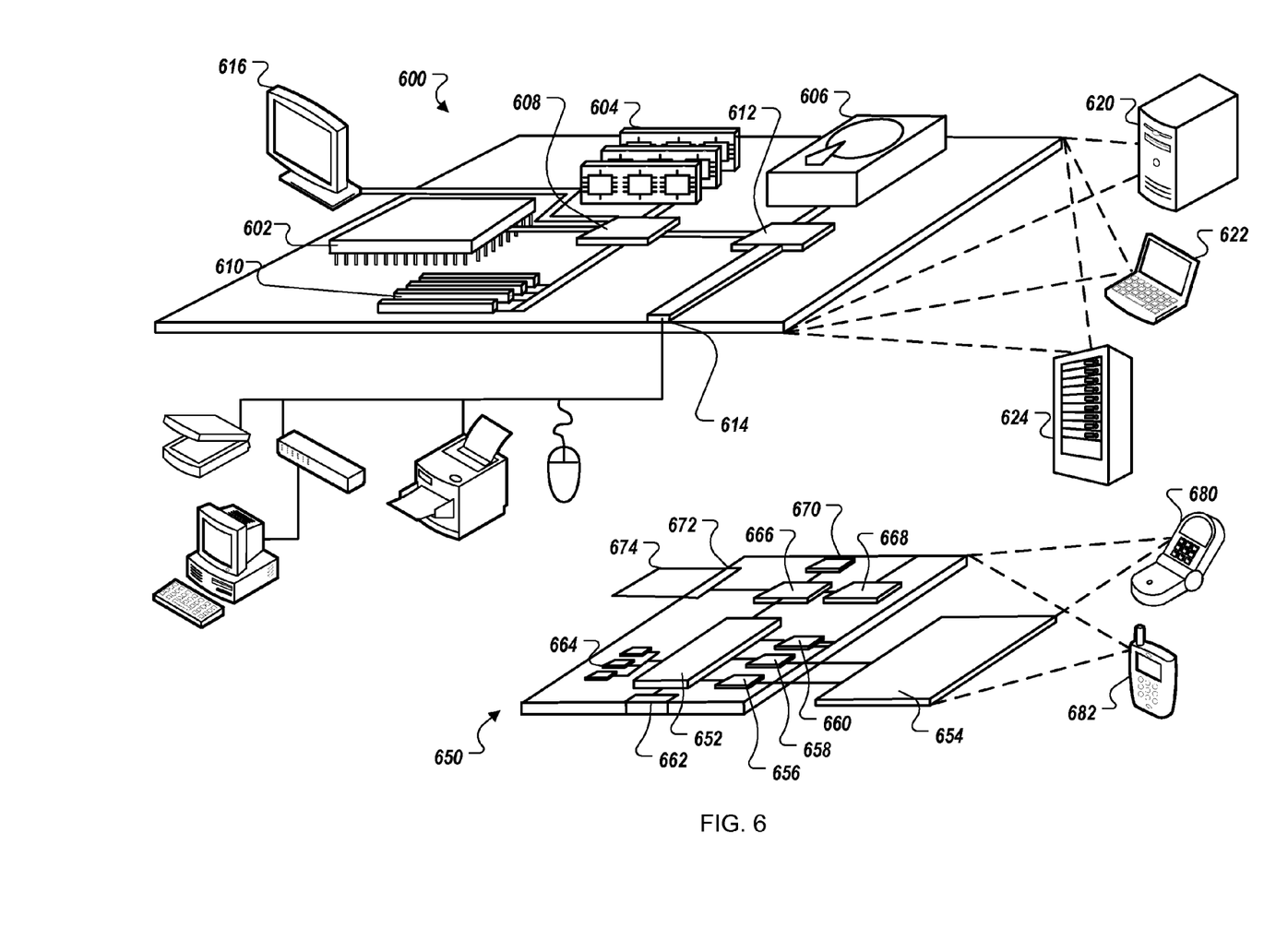
FIG. 6 shows examples of computing devices on which the processes described herein, or portions thereof, may be implemented.

FIG. 6 shows an example of a generic computing device 600 and a generic mobile computing device 650, which may be used to implement all or part of the processes described herein. For example, content management system 410 and search system 412 may be implemented by computing device 600 and mobile computing device 650 may implement a user device 406/406a of FIG. 4. In this regard, computing device 600 is intended to represent various forms of digital computers, examples of which include laptops, desktops, workstations, personal digital assistants, servers, blade servers, mainframes, and other appropriate computers. Computing device 650 is intended to represent various forms of mobile devices, examples of which include personal digital assistants, cellular telephones, smartphones, and other similar computing devices. The components shown here, their connections and relationships, and their functions, are meant to be examples, and are not meant to limit the scope of the appended claims.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, for example, display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, examples of which include a magnetic or optical disk.

The storage device 606 is capable of providing mass storage for the computing device 600. In one implementation, the storage device 606 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 604, the storage device 606, or memory on processor 602. In some examples, the information carrier may be a machine-readable storage medium and not a transitory signal.

The high speed controller 608 manages bandwidth-intensive operations for the computing device 600, while the low speed controller 612 manages lower bandwidth-intensive operations. Such allocation of functions is an example. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer, for example, a laptop computer 622. Alternatively, components from computing device 600 may be combined with other components in a mobile device (not shown), for example, device 650. Each of such devices may contain one or more of computing device 600, 650, and an entire system may be made up of multiple computing devices 600, 650 communicating with each other.

Computing device 650 includes a processor 652, memory 664, an input/output device for example, a display 654, a communication interface 666, and a transceiver 668, among other components. The device 650 may also be provided with a storage device, for example, a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, for example, control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, for example, using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, for example, through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The terms "machine-readable medium" and "computer-readable medium" do not include transitory signals. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

Elements of different implementations described herein may be combined to form other implementations not specifically set forth above. Elements may be left out of the processes, computer programs, Web pages, etc., described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method performed by one or more processing devices, comprising:

receiving, by a processing device, a request for advertising content to supplement a response to an input initiated by a first user;

outputting, by the processing device, first advertising content in response to the request, the first advertising content comprising a graphical user interface control feature that is displayable along with the first advertising content, the graphical user interface control feature enabling the first user to register a negative reaction to the first advertising content;

obtaining, by the processing device, information relating to the first advertising content based on the negative reaction;

identifying, by the processing device, second advertising content having one or more characteristics in common with the first advertising content;

identifying, by the processing device, one or more second users having one or more characteristics in common with the first user based on a search of a user profile of the first user or a search of a social graph of the first user;

determining, based on the information relating to the first advertising content, whether to provide the second advertising content to the one or more second users; and providing, by the processing device and based on the determining, the second advertising content to the one or more second users.

2. The method of claim 1, further comprising:
using the information relating to the first advertising content in determining whether to provide the first content or the second advertising content to the first user in the future.

3. The method of claim 1, wherein the information is used to prevent providing the first advertising content or the second advertising content in the future.

4. The method of claim 1, wherein the information is used to limit providing the first advertising content or the second advertising content in the future.

5. The method of claim 1, wherein the graphical user interface control feature comprises an interactive control feature to close the first advertising content or to be redirected away from the first advertising content.

6. The method of claim 1, wherein the graphical user interface control feature comprises an interactive control feature to provide feedback about the first advertising content.

7. The method of claim 1, wherein the one or more characteristics of the second content are indicative of whether: (1) the first advertising content is part of a same distribution campaign as the second advertising content, (2) the first advertising content and the second advertising content are owned or distributed by a same entity, or (3) the first advertising content and the second advertising content direct users to a domain controlled by a same entity.

8. The method of claim 1, wherein the one or more characteristics of the second advertising content are indicative of whether: (1) the first advertising content and the second advertising content have a topic in common, or (2) the first advertising content and the second advertising content direct users to a same domain or to domains having similar topics.

9. The method of claim 1, wherein the one or more characteristics of the second advertising content are indicative of a relationship of a brand associated with the first advertising content to a brand associated with the second advertising content.

10. The method of claim 1, wherein identifying one or more second users having one or more characteristics in common with the first user comprises:

identifying elements of a profile for the first user that match elements of one or more profiles for the one or more second users, the elements relating to demographics associated with the first user and the one or more second users.

11. The method of claim 1, wherein it is determined not to provide the second advertising content to the one or more second users based on the information.

12. The method of claim 1, wherein it is determined to provide the second advertising content a less favorable position in an auction for providing advertising content to the one or more second users.

13. The method of claim 1, wherein it is determined to increase a price of the second advertising content relative to other advertising content to be provided to the one or more second users.

14. The method of claim 1, wherein the information relating to the first advertising content is used in determining whether to provide the second advertising content to the one or more second users in a context, the context being related to at least one of an aspect of the response to the input and a time at which the first advertising content is to be provided.

15. The method of claim 1, wherein the information is obtained based also on negative reactions to the first advertising content by other users, the information indicating whether the first content elicits a negative reaction in general, elicits a negative reaction in a particular topical or temporal context, or elicits a negative reaction by users having one or more characteristics in common.

16. One or more non-transitory computer readable media storing instructions that are executable by one or more processing devices to perform operations comprising:

receiving a request for advertising content to supplement a response to an input initiated by a first user;

outputting first advertising content in response to the request, the first advertising content comprising a graphical user interface control feature that is displayable along with the first advertising content, the graphical user interface control feature enabling the first user to register a negative reaction to the first advertising content;

obtaining information relating to the first advertising content based on the negative reaction;

identifying second advertising content having one or more characteristics in common with the first advertising content;

identifying one or more second users having one or more characteristics in common with the first user based on a search of a user profile of the first user or a search of a social graph of the first user;

determining, based on the information relating to the first advertising content, whether to provide the second advertising content to the one or more second users; and providing, by the processing device and based on the determining, the second advertising content to the one or more second users.

17. A system comprising:
memory storing instructions that are executable; and
one or more processing devices to execute the instructions to implement a content management system to perform operations comprising:

receiving a request for advertising content to supplement a response to the input initiated by a first user;

outputting first advertising content in response to the request, the first advertising content comprising a graphical user interface control feature that is displayable along with the first advertising content, the graphical user interface control feature enabling the first user to register a negative reaction to the first advertising content;

obtaining information relating to the first advertising content based on the negative reaction;

identifying second advertising content having one or more characteristics in common with the first advertising content;

identifying one or more second users having one or more characteristics in common with the first user based on a search of a user profile of the first user or a search of a social graph of the first user;

determining, based on the information relating to the first advertising content, whether to provide the second content to the one or more second users; and providing, by the processing device and based on the determining, the second advertising content to the one or more second users.

\* \* \* \* \*